United States Patent [19]

Acomb et al.

[11] 4,041,969
[45] Aug. 16, 1977

[54] APPARATUS FOR CONTROLLING THE VOLUMETRIC RATIO BETWEEN MIXED GASES

[75] Inventors: Byron Hillen Acomb; Roger Joseph Dolida, both of Florence, S.C.

[73] Assignee: Union Carbide Corporation, New York, N.Y.

[21] Appl. No.: 566,135

[22] Filed: Apr. 8, 1975

[51] Int. Cl.² ............................................. G05D 11/00
[52] U.S. Cl. ...................................................... 137/88
[58] Field of Search .............................. 137/88; 73/196

[56] References Cited
U.S. PATENT DOCUMENTS

| | | | |
|---|---|---|---|
| 1,947,923 | 2/1934 | Schweitzel | 137/88 X |
| 3,726,300 | 4/1973 | Chevalier | 137/88 |
| 3,739,799 | 6/1973 | Bickford | 137/88 |
| 3,809,109 | 5/1974 | Breiling et al. | 137/88 |
| 3,848,617 | 11/1974 | Dray | 137/88 |

*Primary Examiner*—William R. Cline
*Attorney, Agent, or Firm*—John R. Doherty

[57] ABSTRACT

An elongated hollow tube containing a freely movable ball is used to indicate and vary the ratio between gases to be mixed by passing each gas into a separate end of the tube. A critical pressure relationship is established between the applied gases at any given location relative to each oppposite end of the tube and between the gas pressures at such locations and the pressure on each side of the ball respectively. This relationship is established using pressure regulators on each side of the tube with at least one restricting orifice in one gas line.

1 Claim, 2 Drawing Figures

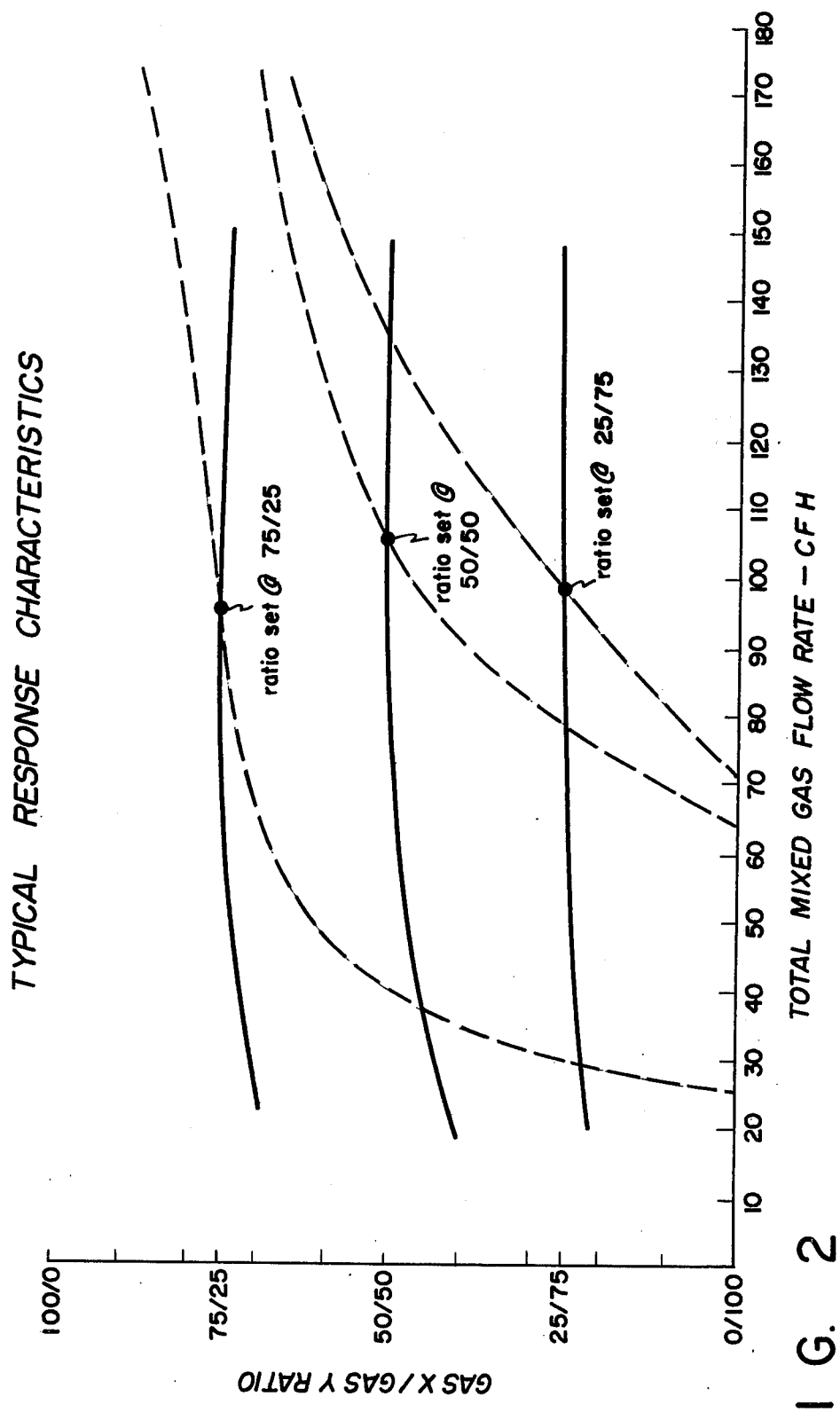

4,041,969

APPARATUS FOR CONTROLLING THE VOLUMETRIC RATIO BETWEEN MIXED GASES

This invention relates to apparatus and method to visually indicate the volumetric ratio between two or more gases, allow the ratio to be easily established or varied as desired and maintain the established visual ratio independent of the total flow rate and as the total flow rate is varied.

BACKGROUND OF THE INVENTION

It is known to measure the mixing proportion of two gases by introducing each gas into opposite ends of a horizontally disposed porous tube containing a movable ball. The position of the ball in the tube is proportional to the ratio of the gases. If the tube is optically transparent it can be readily calibrated for different applied gases to provide a visual indication of the mixed proportion between such gases. This principal has been adopted in the past in an attempt to provide an inexpensive method of visually indicating the ratio between two gases flowing into opposite ends of a porous tube. A mixing chamber is disposed around the porous tube for receiving and mixing the gases delivered to each side of the ball respectively. Adjustment of the ratio between the applied gases is accomplished by throttling at least one of the input gases. This will cause the ball to move and assume a new location within the tube representing the new proportion. As long as the total mixed gas flow remains substantially constant the position of the ball along the tube will provide a substantially accurate as well as visual measurement of the volumetric ratio of the gases in the total mixture. Moreover, even if the total mixed gas flow rate is changed to a new rate the throttling mechanism can be used to reset the position of the ball so that the tube will provide an accurate ratio reading without modifying the original calibration.

For most practical applications however, it is essential that the volumetric ratio between gases remain essentially constant even though the mixed gas flow demand changes. In electric welding, for example, it is required to shield the arc working area with a shielding medium which might be represented by a mixture of carbon dioxide and argon with the proportion of each gas in the mixture and the total mixed gas flow dependent upon working conditions and operator satisfaction. Thus, not only is it necessary for the ratio between the gases to be adjustable but it is also necessary for the total mixed gas flow to be adjustable and preferably under the manual control of the operator. For multiple torch operation the total mixed gas flow demand is dependent upon the number of torches in operation at any given time and the selected gas flow setting for each torch. Hence, for acceptable operation, the apparatus must be capable of providing the gas mixture desired and capable of maintaining the desired mixture under varying mixed gas flow demand conditions.

SUMMARY OF THE INVENTION

This invention overcomes the difficulties heretofore encountered in using a transparent porous tube arrangement with a movable ball for providing a visible indication of the mixing proportion between two or more gases independent of the total mixed gas flow rate. The method of the present invention for maintaining the volumetric ratio between the gases independent of the total mixed gas flow rate comprises:

passing a first one of said gases from a source thereof into one end of an elongated hollow porous tube containing a freely movable ball;

passing a second one of said gases from a source thereof into the opposite end of said tube;

enclosing said tube within a chamber for receiving and mixing said gases;

regulating the pressure of said first gas at a predetermined location with respect to said one end of said tube;

regulating the pressure of said second gas at the regulated pressure of said first gas and at a predetermined location with respect to said opposite end of said tube such that the pressure differential between said regulated pressure and the pressure on either side of the ball within the tube is equal for a predetermined ball location along the length of said tube; and controllably restricting the flow of at least said first gas to said tube so as to adjust the ratio between said gases and accordingly the location of the ball within the tube.

The apparatus of the present invention for adjustably controlling the volumetric ratio between two or more mixed gases independent of the total mixed flow rate comprises:

an elongated hollow porous tube;

a ball freely movable within said porous tube between the opposite ends of said tube respectively;

a source of a first gas;

means for supplying said first gas to one end of said tube;

means for regulating the delivery pressure of said first gas at a predetermined location with respect to said one end of the tube;

a source of a second gas;

means for supplying said second gas to the opposite end of the tube;

means for regulating the delivery pressure of said second gas at the regulated delivery pressure of said first gas and at a location with respect to the opposite end of the tube such that the pressure differential between the regulated pressure of each gas and the pressure on each side of the ball is maintained essentially equal for a predetermined ball location along the length of said tube;

means for controllably restricting the flow of at least said first gas to said tube so as to adjust the position of said ball within the tube;

a chamber surrounding said porous tube for receiving and mixing the gas flow from said tube; and one or more flowmeters or other flow controlling devices connected to the output of said chamber for indicating or controlling the total mixed gas flow rate.

Accordingly, it is an object of the present invention to provide a method of controlling and maintaining the volumetric ratio between at least two gases independent of the total mixed gas flow rate.

It is a further object to provide apparatus which will visually indicate the ratio between the gases being mixed and permit the ratio to be manually adjusted regardless of the mixed total flow demand.

These and other objects will become apparent from the following description when taken in connection with the accompanying drawing.

BRIEF DESCRIPTION OF THE DRAWING

FIG. 2 is a graph illustrating typical response curves at different gas ratio settings for the gas ratio control apparatus shown in FIG. 1 with the solid line response curves representing operation in accordance with the method of the present invention and with comparison response curves representing the prior art shown in dotted lines.

BRIEF DESCRIPTION OF THE PREFERRED EMBODIMENTS

Figure 1:
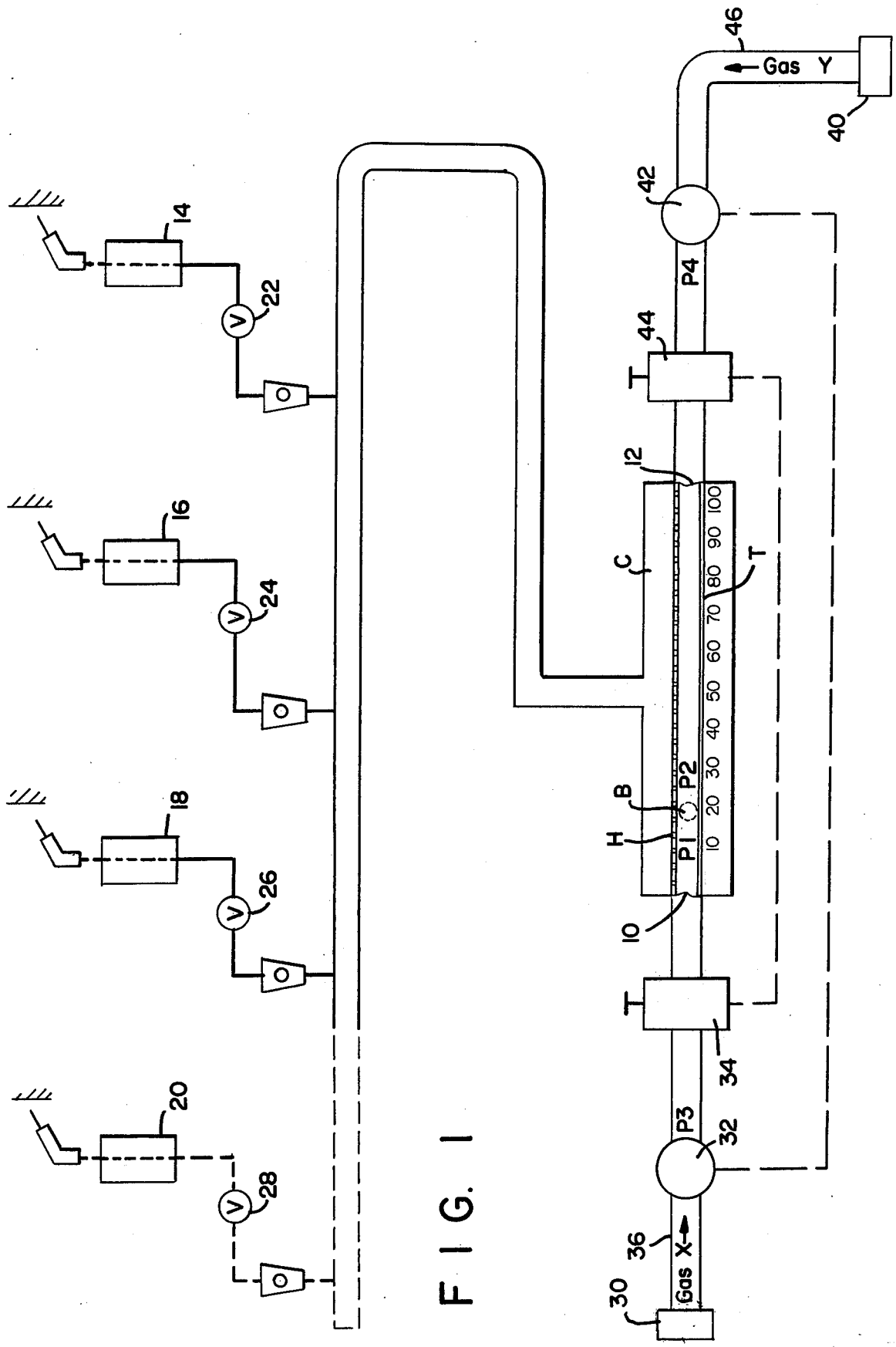
FIG. 1 is a diagrammatic illustration of a typical multi-torch gas flow control system embodying the apparatus of the present invention.

Referring now more particularly to FIG. 1 of the drawing in which is shown an elongated cylindrical tube T containing a freely movable ball B. The ball B is of a diameter substantially equal to the inside diameter of the tube T so as to act as a movable partition dividing the tube T into separate sections each having a length which depends upon the position of the ball of the tube. Any other movable partition would be satisfactory. The tube T must be porous so as to permit gas to pass from both sides of the ball into a surrounding chamber C. For purposes of the present disclosure the word "porous" is intended to embrace a random distribution of a large number of tiny pores or holes in the tube T, a series of drilled holes or a slotted tube.

For use of illustration the tube T is shown with a series of drilled holes H. In addition, tube T should be transparent where a visible indication of the mixing proportion between the applied gases is desirable. Since the invention is not limited to specific gases the input gases are indicated only as gas $x$ and gas $y$, each of which is applied to an opposite inlet end 10 and 12 of the tube T. Tube T should, however, be calibrated for the specific set of gases to be mixed so that an accurate setting or reading of the ratio between such gases can be readily made as will be explained in greater detail hereafter.

Gas $x$ and gas $y$ pass into the surrounding chamber C through the open holes H on each side of the ball B. The gases intermix in the chamber C and pass to the point of use represented in FIG. 1 by a multiple number of welding stations 14, 16, 18 and 20, respectively. Each welding station 14, 16, 18 and 20 includes an independent adjustable valve 22, 24, 26 and 28 for independent operator control over the flow of gas to each torch. It is also preferred to use separate flowmeters to indicate the mixed gas flow rate to each of the stations. Hence, the total mixed gas flow is determined by simple addition and will depend upon the number of welding stations operating at any given time and the individual adjustment to the gas flow at each of such stations respectively.

Gas $x$ is supplied from any conventional supply source 30 to the inlet end 10 of tube T through an adjustable control pressure regulator 32 and through an adjustable gas flow restrictor 34. In the same fashion gas $y$ is supplied from any conventional supply source 40 to the opposite inlet end 12 of tube T through a control pressure regulator 42 and an adjustable gas flow restrictor 44. A gas flow restrictor for purposes of the present invention includes either a fixed orifice or an adjustable valve. The dotted lines between the control regulators 32 and 42 and between the restrictors 34 and 44 indicate that they may be coupled to one another for reasons of which will be explained hereafter.

It is known that to dynamically stabilize the ball so that it remains in a fixed position somewhere within the tube T while gas is continuously flowing into the tube through each of its inlet openings 10 and 12 respectively, requires only that the pressure P1 on one side of the ball B equals the pressure P2 on the opposite side of the ball B. At such time the flow of the one gas $x$ compared to the flow of the other gas $y$ is proportional to the number of orifices H uncovered on each side of the ball B. The ratio between the gas flows will then be apparent from the location of the ball B in the tube T. In fact, any set of conditions between each inlet opening 10 and 12 and its corresponding supply source 30 and 40 respectively which will cause the ball to stand still in the tube will also necessarily have resulted in P1 being equal to P2 for that ball position. Likewise, once a stable position is established the stable position can be shifted along the tube by throttling the flow of gas into either or both of the inlets 10 and 12. Hence, a rudimentary system common to the prior art involves merely the introduction of gas $x$ and gas $y$ at relatively arbitrary pressure with at least one throttling valve downstream of either source. The throttling valve is used to adjust the position of the ball in the tube T which could then be calibrated in ratio percentages for the particular gases being mixed. Typical curves showing the response of such a system for argon — $CO_2$ mixtures under varying flow conditions is shown in dotted lines in FIG. 2. Note that once the ball is set for a particular ratio, the position of the ball, which is indicative of such gas ratio, varies substantially with variations in the total mixed gas flow rate.

Applicant has discovered that the ratio between the gases can be rendered substantially independent of the total gas flow requirement by establishing a certain critical relationship between the pressures of the applied gases at any given location relative to each opposite end of tube T and between the gas pressures at such locations and the pressure on either side of the ball B within the tube T. It is thus essential to the present invention that a first predetermined pressure P3 be established for one of the applied gases such as gas $x$. This can be accomplished using pressure regulator 32. It is then fundamental to the present invention that the pressure P4 of gas $y$ be held essentially equal to pressure P3 although the absolute value of the pressure may vary. Pressure P4 can be established using the pressure regulator 42. To maintain this fixed pressure relationship between P3 and P4 the control regulators 32 and 42 can be coupled to one another so that any variation in pressure P3 will automatically cause a corresponding pressure change in the pressure P4. Coupling pressure regulators to one another to establish a slave relationship between the regulators is well known in the art.

The secondary requirement of the critical relationship is to maintain the pressure differential P3-P1 equal to the pressure differential P4-P2. This is assured merely by satisfying the primary requirement that P3 equal P4 for any predetermined stable position of the ball in the tube T. However, the stable position of the ball B in tube T must be adjustable for a viable device. In accordance with the present invention the ball B can be laterally shifted in either direction from its stable position to a new stable position by incorporating a fixed orifice in either gas line 36 or 46 respectively at a location downstream of the regulated pressures P3 and P4. Alternatively, the ball B can be shifted by a variable amount in either direction from its stable position by incorporating a variable orifice in place of the fixed orifice. An adjustable valve 34 and 44 is shown in FIG. 1 representing the variable orifices. It is important however, that the use of one or both valves 34 and 44 does not disturb the critically defined pressure relationship; namely, that the upstream pressures P3 and P4 to each of the valves 34 and 44 respectively be the same although the absolute upstream pressure may vary. For full range of control the adjustable valve 34 can be linked to the adjustable valve 44 such that increasing one valve form maximum open to full closed will result in a corresponding linear adjustment of the other but in an inverse relationship from full closed to maximum open.

The initial position of the ball is preferably established near the center of the tube T so that such position will represent a 50—50 mix between gas $x$ and gas $y$. For one valve operation this should be accomplished with the valve full open so that the port passage connecting each pressure regulator with the tube T will exhibit nearly equal pressure drops for equal gas flows. Thus only one pressure regulator, for example, regulator 32, need be set to any preferred pressure P3 and the other regulator 42 adjusted until the ball rests near the center of the tube T. Once the adjustment is made P4 will equal P3 and the pressure drop to each side of the ball B will be the same. It should be understood that the pressures P3 and P4 can be set equal to one another for any ball location in tube T with the valve in a position other than full open. Thereafter the tube T can be calibrated in ratio percentages to provide control over the mixing proportion between the supplied gases. For double valve operation ratios from 100%-0% to 0%—100% can be obtained by alternating the setting of each valve from full open to full close.

Once the critical relationship between pressures P3 and P4 is established the apparatus will deliver mixed ratios independent of total flow rate. The typical response curves for argon-carbon dioxide mixes are shown in FIG. 2 by solid lines and are essentially flat for each of the ratio settings thereby indicating independence of total flow rate.

A mathematical analysis confirming the discovered critical relationship follows:

If the flow of each gas is subcritical a representation flow equation is:

$Q = C\ F\ \rho P_D K$ where;

$Q$ = flow rate in cfh (cubic ft/hr)
$C$ = a constant depending upon the gas
$F$ = orifice area in in$^2$
$\rho$ = orifice coefficient
$P_D$ = pressure on each side of ball
$K$ = a function of $P\mu/P_D$ where $P\mu$ is pressure upstream of each valve If the upstream pressure to each valve is the same and the downstream pressure on each side of the ball is the same the function K is the same for each gas. The constant C is approximately the same for most gases except where they vary widely in density. Then the flow for gas $x$ (Qx) and the flow for gas $y$ (Qy) can be written as follows:

$$\frac{Qx}{Qy} = \frac{(CF\rho P_D K)x}{(CF\rho P_D K)y} = \text{constant}$$

Therefore, once the mixing proportion between gas $x$ and gas $y$ is established the total flow can be changed at will without upsetting the ratio. For example, assume gas $x$ is Argon and gas $y$ is $CO_2$ and the valves are adjusted for a 75%/25% mix at 100 cfh. The flow rate for $CO_2$ would be 25 cfh and the flow rate for Argon would be 75 cfh resulting in a Qx/Qy constant of 3. If the total flow rate was increased to 200 cfh the flow rate of $CO_2$ would increase to 50 cfh and Argon to 150 cfh with the Qx/Qy ratio still at 3. The absolute downstream pressure at each side of the ball is allowed to change and the absolute upstream pressure from each valve is allowed to change but the upstream pressures would remain equal to one another and maintain the same pressure drop to each side of the ball.

Levelness of Tube T affects the ratio reading by causing the ball B to be biased in the direction of tilt. This can be used as a compensation mechanism to provide a slight bias as an offset in such cases where substantial variation in gas densities exist. For most practical cases, however, it is preferred that the tube T be level.

It should be obvious that many modifications can be made to the apparatus without departing from the spirit and scope of the claims as hereinafter desired.

We claim:
1. Apparatus for adjustably controlling the volumetric ratio between two or more gases independent of the total mixed flow rate comprising:
   an elongated hollow porous tube;
   a ball freely moveable within said porous tube between the opposite ends of said tube respectively;
   a source of a first gas;
   means for supplying said first gas to one end of said tube;
   means for regulating the delivery pressure of said first gas at a predetermined location with respect to said one end of the tube;
   a source of a second gas;
   means for supplying said second gas to the opposite end of the tube;
   means for regulating the delivery pressure of said second gas at the regulated delivery pressure of said first gas and at a location with respect to the opposite end of the tube such that the pressure differential between the regulated pressure of each gas and the pressure on each side of the ball is maintained essentially equal for a predetermined ball location along the length of said tube;
   a first adjustable valve for controllably restricting the flow of said first gas;
   a second adjustable valve for controllably restricting the flow of said second gas, said first and second adjustable valves being coupled together for common adjustment so as to establish an inverse flow relationship between said first and second gases;
   a chamber surrounding said porous tube for receiving and mixing the gas flow from said tube and having an output for delivering the mixed gases; and
   means connected to the output of said chamber for adjusting the total mixed gas flow rate.

* * * * *